(12) United States Patent
Killian

(10) Patent No.: US 6,425,076 B1
(45) Date of Patent: Jul. 23, 2002

(54) INSTRUCTION PREDICTION BASED ON FILTERING

(75) Inventor: Earl A. Killian, Los Altos Hills, CA (US)

(73) Assignee: MIPS Technologies, Inc., Mountain View, CA (US)

(*) Notice: Subject to any disclaimer, the term of this patent is extended or adjusted under 35 U.S.C. 154(b) by 0 days.

(21) Appl. No.: 09/544,352

(22) Filed: Apr. 6, 2000

Related U.S. Application Data

(63) Continuation of application No. 08/935,369, filed on Sep. 22, 1997, now Pat. No. 6,092,187, which is a continuation-in-part of application No. 08/934,280, filed on Sep. 19, 1997, now abandoned.

(51) Int. Cl.[7] ................................................. G06F 9/38
(52) U.S. Cl. ........................................ 712/239; 712/240
(58) Field of Search ............................... 712/239, 240, 712/238

(56) References Cited

U.S. PATENT DOCUMENTS 5,564,118 A   10/1996   Steely, Jr. et al.
5,758,142 A   5/1998    McFarling et al.

OTHER PUBLICATIONS

Pat et al., "One Billion Transistors, One Uniprocessor, One Chip," *Computer*, IEEE, pp. 51–57, Sep. 1997.

Chang et al., "Alternative Implementations of Hybrid Branch Predictors," Proceedings of the 28th Annual International Symposium on Microarchitecture, 1995, IEEE, pp. 252–257, Nov. 29–Dec. 1, 1995.

Evers et al., "Using Hybrid Branch Predictors to Improve Branch Prediction Accuracy in the Presence of Contest Switches", 23rd Annual International Symposium on Computer Architecture, pp. 3–11, May 1996.

Chang et al., "Target Prediction for Indirect Jumps," *Proceedings of the 24th Annual Int'l Symposium on Computer Architecture*, Denver, CO, Jun. 2–4, 1997, pp. 274–283.

Jacobsen et al., "Assigning Confidence to Conditional Branch Predictions," *IEEE/ACM Int'l Symposium on Microarchitecture*, Paris, France, Dec. 2–4, 1996, pp. 142–152.

Yeh et al., "A Comparison of Dynamic Branch Predictors That Use Two Levels of Branch History," *The 20th Annual Int'l Symposium on Computer Architecture*, San Diego, CA, May 16–19, 1993, pp. 257–266.

Yeh et al., "Alternative Implementations of Two–Level Adaptive Branch Predictions," *The 19th Annual Int'l Symposium on Computer Architecture*, Gold Coast, Australia, May 19–21, 1992, pp. 124–134.

McFarling, "Combining Branch Predictors," *WRL Technical Note TN–36*, Digital Western Research Laboratory, Jun. 1993, pp. 1–25.

*Primary Examiner*—William M. Treat
(74) *Attorney, Agent, or Firm*—Townsend and Townsend and Crew LLP

(57) ABSTRACT

Instruction prediction based upon confidence and priority levels. A filtering effect is achieved by providing for prediction of an instruction by one of a plurality of predictors having (1) a confidence level satisfying a predetermined threshold value and (2) the highest priority level among the plurality of predictors. A default predictor is provided should no predictor satisfy this criteria. Efficient use of predictor memory is achieved through selective updating of predictors.

27 Claims, 10 Drawing Sheets

Microfiche Appendix Included
(1 Microfiche, 31 Pages)

TOTAL INSTRUCTIONS:   1473778275
TOTAL BRANCHES:       207515782
BCOUNT INSTRUCTIONS:          0
COUNTED BRANCHES:             0

| PREDICTOR TYPE | MEM | M | B | M/B |
|---|---|---|---|---|
| bimodal['12] | 1024 | 26542357 | 207515782 | 0.1279 |
| bimodal['13] | 2048 | 25429690 | 207515782 | 0.1225 |
| bimodal['14] | 4096 | 24740522 | 207515782 | 0.1192 |
| local['9x11_'11] | 1216 | 33353900 | 207515782 | 0.1607 |
| local['10x11_'11] | 1920 | 27249892 | 207515782 | 0.1313 |
| local['11x12_'12] | 4096 | 22587992 | 207515782 | 0.1088 |
| local['10x8_'8] | 1088 | 30706368 | 207515782 | 0.1480 |
| local['11x8_'8] | 2112 | 26618998 | 207515782 | 0.1283 |
| local['12x8_'8] | 4160 | 23457556 | 207515782 | 0.1130 |
| local['11x4_'4] | 1028 | 31127832 | 207515782 | 0.1500 |
| local['12x4_'4] | 2052 | 27950198 | 207515782 | 0.1347 |
| local['13x4_'4] | 4100 | 26534407 | 207515782 | 0.1279 |
| gshare[8(<<4)_'12] | 1025 | 25201755 | 207515782 | 0.1214 |
| gshare[9(<<4)_'13] | 2050 | 20877237 | 207515782 | 0.1006 |
| gshare[10(<<4)_'14] | 4098 | 17688778 | 207515782 | 0.0852 |
| pair['10][bimodal('10),gshare(11_'11)] | 1026 | 22780786 | 207515782 | 0.1098 |
|   bimodal['10] | 256 | 32693264 | 207515782 | 0.1575 |
|   gshare[11_'11] | 514 | 36483651 | 207515782 | 0.1758 |
| pair['11][bimodal('11),gshare(12_'12)] | 2050 | 18316187 | 207515782 | 0.0883 |
|   bimodal['11] | 512 | 29083070 | 207515782 | 0.1401 |
|   gshare[12_'12] | 1026 | 29094774 | 207515782 | 0.1402 |
| pair['12][bimodal('12),gshare(13_'13)] | 4098 | 15127601 | 207515782 | 0.0729 |
|   bimodal['12] | 1024 | 26542357 | 207515782 | 0.1279 |
|   gshare[13_'13] | 2050 | 23695094 | 207515782 | 0.1142 |
| filter[last('10):3–4,gshare(12_'12x1)] | 1026 | 21551376 | 207515782 | 0.1039 |
|   last['10] | 512 | 40793795 | 207515782 | 0.1966 |
|   gshare[12_'12x1] | 514 | 17571673 | 94533972 | 0.1859 |
| filter[last('11):3–4,gshare(13_'13x1)] | 2050 | 17138826 | 207515782 | 0.0826 |
|   last['11] | 1024 | 36685637 | 207515782 | 0.1768 |
|   gshare[13_'13x1] | 1026 | 13514386 | 84998341 | 0.1590 |
| filter[last('12):3–4,gshare(14_'14x1)] | 4098 | 14553073 | 207515782 | 0.0701 |
|   last['12] | 2048 | 34283339 | 207515782 | 0.1652 |
|   gshare[14_'14x1] | 2050 | 11202582 | 78688336 | 0.1424 |

FIG. 11

INSTRUCTION PREDICTION BASED ON FILTERING

CROSS REFERENCE TO RELATED APPLICATIONS

This application is a continuation of U.S. Ser. No. 08/935,369, now U.S. Pat. No. 6,092,187, which is a continuation-in-part of U.S. patent application Ser. No. 08/934,280, filed Sep. 19, 1997, now abandoned, the disclosures of which (including all appendices and attachments) are incorporated by reference in their entirety for all purposes.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

MICROFICHE APPENDIX

A microfiche appendix containing one (1) sheet and thirty-one (31) frames is included as an appendix to this application and is hereby incorporated by reference in its entirety for all purposes. The microfiche appendix is directed to code listings containing an embodiment of the invention.

BACKGROUND OF THE INVENTION

The present invention relates generally to the field of computer-instruction prediction and, in particular, to instruction prediction based on filtering.

Branch prediction, a particular type of instruction prediction, has become critical to the performance of modern pipeline microprocessors. As pipelines grow in length, instruction fetch (performed in one stage of a pipeline) moves farther away from instruction execution (performed in another stage of the pipeline). Conditional branches (also referred to as conditional jumps) are one of the few operations where instruction execution affects instruction fetch. If instruction fetch must wait for execution of a conditional branch before proceeding, considerable performance is lost due to the number of pipeline stages between the two. As a result, conditional branches are typically predicted in an instruction fetch unit as taken or not-taken with a mechanism independent of instruction execution. Based on this prediction, subsequent instructions are speculatively fetched.

However, branch prediction is often wrong. In many cases, therefore, speculative instructions predictively fetched must be "killed" and instructions from the correct path subsequently fetched as replacements. Thus, the misprediction rate of a branch predictor is a critical parameter for performance. (Another important parameter is the cost of a misprediction, which is usually related to the number of pineline stages between fetch and execution.)

FIG. 1 illustrates the general interface between a conventional branch predictor 102 and a conventional microprocessor or any other computer system in which predictor 102 may reside (referred to herein as a "host processor" 103). Typically, branch predictor 102 resides within a host processor. However, for ease of discussion, FIG. 1 shows predictor 102 coupled to host processor 103. Standard control signals between predictor 102 and processor 103, well known to those having ordinary skill in the art, are omitted for clarity of discussion.

Through the use of a program counter (not shown), host processor 103 supplies a conditional branch-instruction address or portion thereof (i.e., "BranchPC" 104), and the predictor responds with a prediction (also referred to as a "prediction value") 106 and some state information; i.e., StateOut 108. This state information is associated with a particular BranchPC and includes information necessary to update predictor 102 after an associated conditional branch instruction is executed.

More specifically, upon execution of the associated conditional branch instruction (i.e., when the subject condition becomes known), processor 103 generates an actual outcome value 110 (e.g., a single bit indicating whether the branch is taken or not-taken) and returns this to predictor 102 along with StateIn 108' through a feedback loop 105. StateIn 108' is the same information provided as StateOut 108 for the particular BranchPC 104; this information has been maintained within processor 103 until the associated conditional branch instruction has been executed and outcome value 110 is available. Predictor 102 will use StateIn 108' for updating purposes if necessary. For example, StateIn 108' and StateOut 108 (i.e., state information) may include an address for a memory (i.e., table) within predictor 102 that is associated with the subject conditional branch instruction, and a is used to store the associated outcome value 110 within the memory. An example of a branch predictor disposed within a processor is the MIPS R10000 microprocessor created by Silicon Graphics, Inc., of Mountain View, Calif.

Methods for branch prediction are evolving rapidly because the penalty for misprediction and performance requirements for processors are both increasing. Early branch prediction simply observed that branches usually go one way or the other, and therefore predicted the current direction (i.e., taken/not-taken) of a conditional branch to be the same as its previous direction; so-called "last-direction prediction." This method requires only one bit of storage per branch.

On a sample benchmark (i.e., the 126.gcc program of SPECint95 available from the Standard Performance Evaluation Corporation) simulating a predictor with a 4 KB table (i.e., a memory disposed within the predictor for holding predictions associated with particular conditional branch instructions), such last-direction prediction had a 15.6% misprediction rate per branch.

A simple improvement to last-direction prediction is based on the recognition that branches used to facilitate instruction loops typically operate in a predictable pattern. Such branches are typically taken many times in a row for repeated execution of the loop. Upon reaching the last iteration of the loop, however, such branch is then not-taken only once. When the loon is re-executed, this cycle is repeated. Last-direction prediction mispredicts such branches twice per loop: once at the last iteration when the branch is subsequently not-taken, and again on the first branch of the next loop, when the branch is predicted as not-taken but is in fact taken.

Such double misprediction can be prevented, however, by using two bits to encode the history for each branch. This may be carried out with a state machine that does not change the predicted direction until two branches are consecutively encountered in the other direction. On the sample benchmark, this enhancement lowered the simulated misprediction rate to 12.1%. This predictor is sometimes called "bimodal" in the literature.

Additional improvements to branch prediction include the use of global and/or local "branch history" to pick up correlations between branches. Branch history is typically represented as a finite-length shift register, with one bit for each taken/not-taken outcome shifted into the register each time a branch is executed. Local history uses a shift register per branch and exploits patterns in the same to make predictions. For example, given the pattern 10101010 (in order of execution from left to right) it seems appropriate to predict that the next branch will be taken (represented by a logic one). Global history, on the other hand, uses a single shift register for all branches and is thus a superset of local history.

A variety of methods have been suggested for utilizing history in branch prediction. Two representative methods for local and global history are called "PAG" and "GSHARE," respectively. These methods are further described in one or more of the following: Yeh, et al., "A Comparison of Dynamic Branch Predictors That Use Two Levels of Branch History," *The 20th Annual International Symposium on Commuter Architecture*, pp. 257–266, IEEE Computer Society Press (May 16–19, 1993); Yeh, et al., "Alternative Implementations of Two-Level Adoptive Branch Predictions," *The 19th Annual International Symposium on Computer Architecture*, pp. 124–134, Association for Computing Machinery (May 19–21, 1992); and S. McFarling, "Combining Branch Predictors," *WRL Technical Note TN*-36, Digital Equipment Corp. (1993) ("McFarling"), each of which is hereby incorporated by reference in its entirety for all purposes.

On the sample benchmark, PAG and GSHARE lowered the simulated misprediction on rate to 10.3% and 8.6%, respectively. In general, global history appears to be better than local history because the history storage is only a few bytes, leaving more storage for predictions.

A further improvement to branch prediction is achieved by combining two different predictors into a single branch prediction system, as described in McFarling. The combined-predictor system of McFarling runs two branch predictors in parallel (i.e., bimodal and GSHARE), measures which one is better for a particular conditional branch, and chooses the prediction of that predictor. On the sample benchmark, a combined-predictor system using bimodal and GSHARE achieved a simulated mispredict rate of 7.5%.

Another variation to branch prediction is suggested in E. Jacobsen, et al., "Assigning Confidence to Conditional Branch Prediction," *Proceedings of the 29th Annual IEEE/ACM International Symposium on Microarchitecture*, IEEE Computer Society Press, pp. 142–152 (Dec. 2–4, 1996) ("Jacobsen"), which is hereby incorporated by reference in its entirely for all purposes. Jacobsen describes a method for determining a "confidence level" for a given branch prediction. Jacobsen suggests that confidence signals may be used, for example, to select a prediction in a system that uses more than one predictor.

One suggested confidence-level measure is embodied in a resetting counter which increments on each correct prediction (but stops at its maximum value), and is reset to zero on a misprediction. (This resetting counter may be a saturating counter; i.e., one that does not decrement cast zero nor increment past its maximum value.) Larger counter values indicate greater confidence in a prediction. Exemplary pseudocode for this confidence-level measure is provided in Table 1 below.

TABLE 1

| Confidence: | high confidence if count at |
| --- | --- |
|   conf – count = countMax | maximum |
| Update: | |
|   if actual = prediction then | |
|     if count < countMax then | increment count if correct, |
|       count – count + 1 | saturate at maximum |
|     endif | |
|   else | |
|     count – 0 | reset count if incorrect |
|   endif | |

The foregoing discussion is directed primarily to maintaining a prediction state or history per branch instruction. In practice, however, such information is kept in fixed size memories (i.e., "tables"). The information is typically untagged, and so prediction data for multiple conditional branches often share the same location in the tables undetected. When this happens, it usually increases the misprediction rate. The more advanced methods store more information per branch, and so there is a tension between the reduction in the mispredict rate from the additional information and the increase in the mispredict rate due to increased sharing.

A combined predictor, as described in McFarling, that chooses between GSHARE and bimodal can take advantage of the fact that sometimes history helps to predict a given branch, and sometimes history is not relevant and may actually be harmful. Such predictor operates by running both predictors in parallel and choosing the better one. Selection criteria for choosing an acceptable prediction may be a confidence level. In such a situation, however, both predictors (and the chooser) consume costly table space, even when the prediction of one predictor or the ocher is almost never used for certain branches. The extra table space consumed by the unused predictor increases false sharing (i.e., the use of a prediction for one branch instruction by another), and thus reduces accuracy.

Moreover, selection criteria based solely on a confidence level may be inadequate when, for example, more than one predictor is sufficiently confident. There is a need for distinguishing between multiple predictor alternatives that may be uniformly deemed sufficiently confident (and therefore acceptable).

Accordingly, it would be desirable to have a predictor system and method that efficiently uses table space for servicing instructions that utilize prediction information, such as conditional branches, to reduce false sharing and thereby increase prediction accuracy. Further, it would be desirable to have a prediction system that distinguishes among a plurality of choices that are each deemed acceptable through a confidence level or other acceptance-testing mechanism.

SUMMARY OF THE INVENTION

The invention provides method and apparatus for generating predictions that in accordance with at least one embodiment efficiently use table space for servicing conditional instructions. Further, the invention provides a system that in accordance with at least another embodiment prioritizes and thereby distinguishes predictions, each of which may be deemed equally acceptable to use through a confidence level or any other acceptance-testing mechanism.

In a first embodiment, a system is provided that generates a prediction for a given situation. This system includes a plurality of predictors generating a plurality of prediction values for the given situation, means for processing said plurality of prediction values to produce the prediction, and a feedback loop coupled to the plurality or predictors for updating only a portion of the predictors bases upon an actual outcome of the given situation.

In another embodiment, a method is provided that generates a prediction for a given instruction. This method includes the steps of providing a plurality of predictors for receiving address information of the instruction and producing a prediction value by at least one predictor of the plurality of predictors. Further, this method also includes processing the prediction value to generate the prediction, and updating only a portion of the predictors with actual outcome information provided from execution of the given instruction.

In yet another embodiment, a predictor system is provided that generates a desired prediction for a given instruction. This system includes a plurality of predictors generating a plurality of predictions, each predictor being assigned a priority level and at least one predictor being operable to indicate acceptability of its prediction. Coupled to the plurality of predictors is a selection circuit which selects the desired prediction from a desired predictor. In accordance with this system, the desired predictor is (1) a first predictor when such predictor indicates acceptability of its prediction and has a highest assigned priority level among any other predictor of the plurality or predictors that also indicates acceptability of its respective prediction; and (2) a second predictor when none of the plurality of predictors indicates acceptability of its prediction, this second predictor having a lowest assigned priority level.

Existing host processors are easily modified to incorporate the predictor system of the present invention. Moreover, such predictor system accommodates further enhancements to the host processor such as trace caches (which may be controlled by confidence levels) at relatively low cost.

A further understanding of the nature and advantages of the invention may be realized by reference to the remaining portions of the specification and drawings. Like reference numbers in the drawings indicate identical or functionally similar elements.

BRIEF DESCRIPTION OF THE DRAWINGS

FIG. 11 illustrates trace-driven simulation results from a number of predictors and predictor systems.

DETAILED DESCRIPTION OF SPECIFIC EMBODIMENTS

The following embodiments are directed to systems and methods servicing conditional branch instructions. However, the present invention is applicable to any operation or situation where prediction information may be used.

A. System 200

Figure 1:
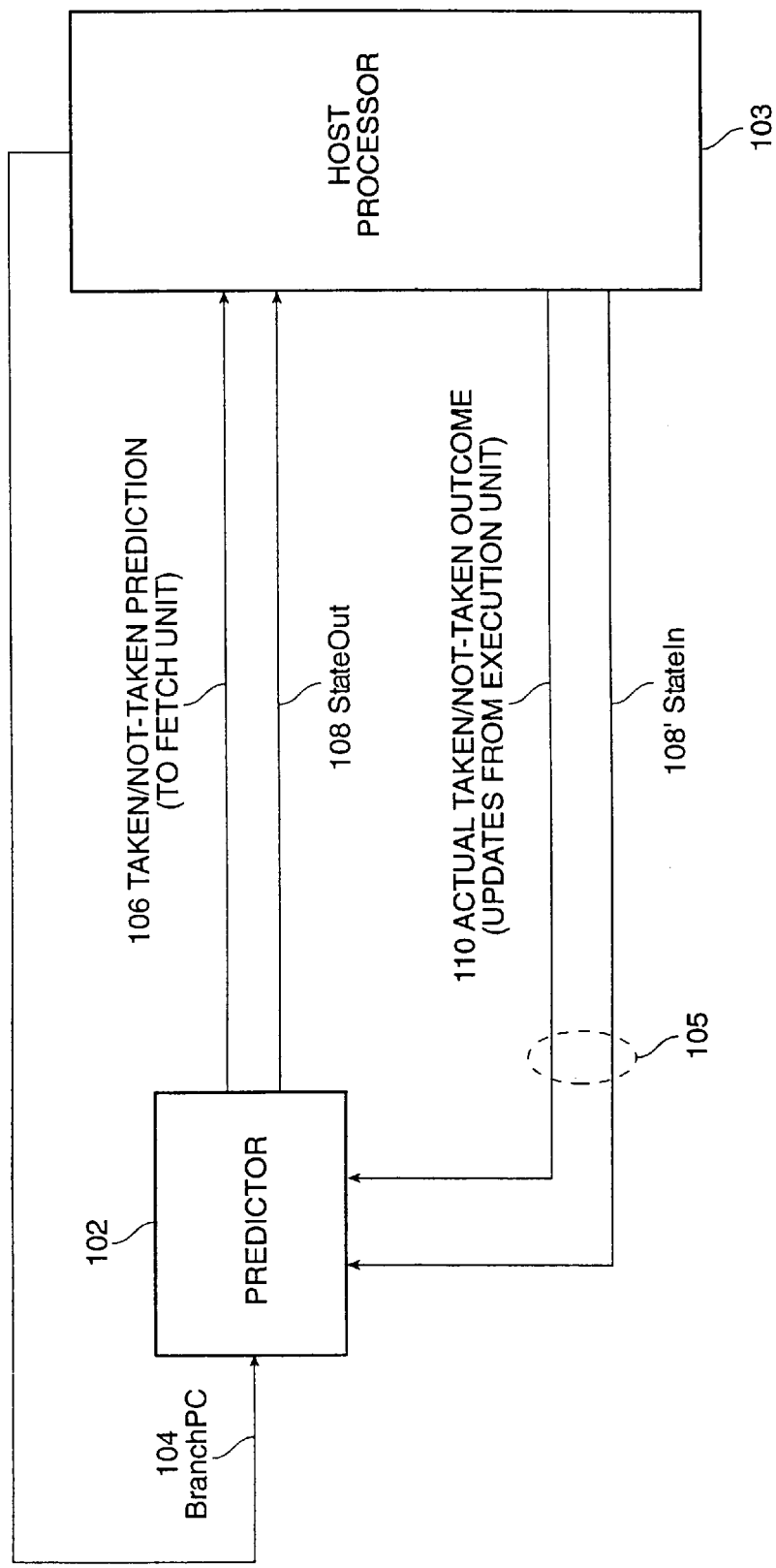
FIG. 1 illustrates the general interface between a conventional branch predictor and a conventional host processor.
Figure 2:
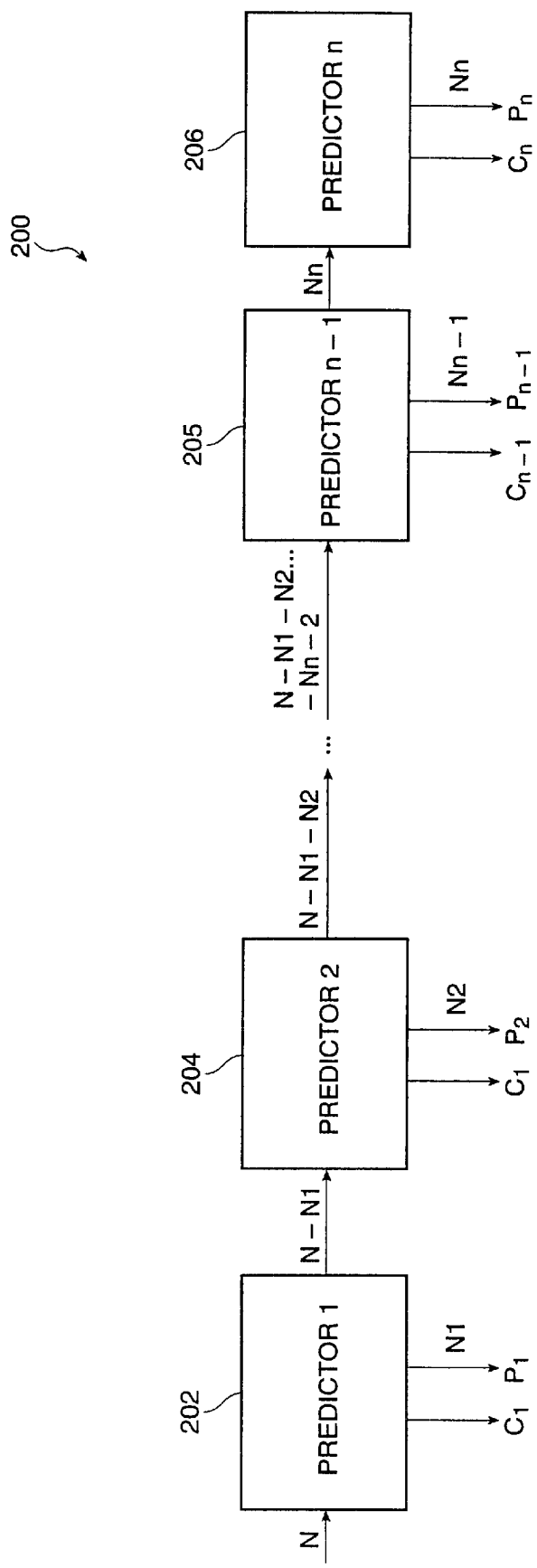
FIG. 2 is a block diagram illustrating the conceptual flow of conditional branch instructions through a branch predictor system using filtering in accordance with the principles of the invention.

FIG. 2 is a block diagram illustrating how conditional branch instructions conceptually flow through a branch predictor system 200 that uses filtering in accordance with the principles of the present invention. Like predictor 102 of FIG. 1, system 200 interfaces with a conventional host processor (not shown). In accordance with conventional branch prediction operation, system 200 supplies a prediction (also referred to as a "prediction value ") and state information to the host processor to enable the processor to predict a bending, conditional branch instruction. In response, the processor supplies an actual outcome value (indicating whether a branch is taken or not-taken) and state information to enable the predictor system to update if necessary.

As shown in FIG. 2, a number of individual constituent predictors 202, 204, 205 and 206 are serially disposed within system 200. Each constituent predictor may be constructed from a conventional branch predictor modified to generate confidence levels in accordance with methodologies described herein. Accordingly, each predictor generates a branch prediction "P" and confidence level "C" for a received BranchPC. Predictors 202–206 are hierarchically arranged in a gradually decreasing "priority level" from left to right. The priority level assigned to each predictor defines the relative preference of using a particular predictor among all others in system 200, subject to satisfying additional criteria (i.e., confidence level) as described below.

In operation, the prediction for a given branch instruction will be provided by system 200 from a predictor with the highest priority that has a confidence level satisfying a predetermined threshold value ("PTV"). A confidence level may "satisfy" PTV by, for example, (1) having a value that is equal to PTV, 2) having a value that is greater than or equal to PTV or 3) having a value that satisfies any other test applied to a given situation. Should a confidence level "satisfy" PTV, the associated prediction is considered acceptable for use; although its relative desirability (with respect to output from other predictors) is dependent upon the priority level of the associated predictor.

Should no confidence level satisfy PTV for the given branch, a prediction from the predictor of lowest priority shall be used by default. Accordingly, referring to system 200 of FIG. 2, the number of branch instructions available for prediction by a given predictor from left to right likely decreases in accordance with decreasing priority levels. Predictor 202, having the highest priority, will conceptually consider all (ice., N) branches in a given application and service those for which it is sufficiently confident; i.e., the confidence level C of the predictor for the branch instruction being considered satisfies a PTV.

However, predictor 204, having a lower priority, will conceptually consider only those branches not serviced by preceding predictor 202 (i.e., N–N1). Again, this predictor will only service those branch instructions for which it is sufficiently confident. Further, predictor 206, having the lowest priority, will conceptually consider only those branches not serviced by any preceding predictor. This predictor will service all branch instructions regardless of the corresponding confidence level. As such, the series of predictors 202–205 "filters" branch instructions using confidence and priority levels to select a predictor of highest possible priority for any given instruction. Any residual is serviced by predictor 206. The use of predictors to selectively service branch instructions based on confidence and priority levels is referred to herein as "branch-prediction filtering."

Referring again to FIG. 2, first predictor 202 yields a prediction "$P_1$" and a prediction confidence level "$C_1$" for a given branch instruction. If $C_1$ satisfies a PTV (e.g., if $C_1$ is greater than or equal to PTV), predictor 202 is desired for supplying a prediction. Accordingly, $P_1$ is selected and forwarded to the host processor to predict the given branch, and the remaining downstream predictors are ignored. However, if $C_1$ does not satisfy PTV (e.g., $C_1$ is less than PTV), the next predictor 204 in the chain is evaluated for selection and use. Conceptually, this serial process continues down the chain or predictors until either a sufficiently high confidence level is found, or the final predictor (i.e., predictor 206) is reached. If the final predictor is reached, this predictor becomes desired for supplying a prediction and the associated prediction "Pn" is selected for the given branch regardless of the confidence level "Cn".

Prediction methodology applied to system 200 of is summarized in the pseudocode of Table 2.

TABLE 2

Prediction Methodology.

```
pred1, conf1, state1 - Predictor1 (BranchPC)
pred2, conf2, state2 - Predictor2 (BranchPC)
. . .
predN, confN, stateN - PredictorN (BranchPC)
if conf1 then
    pred – pred1
elseif conf2 then
    pred – pred2
. . .
else
    pred – predN
endif
```

Referring to the pseudocode in Table 2, predictions ("pred#"), confidence levels ("conf#"), and state information ("state#") variables for each predictor stage are initially assigned values in parallel. Beginning with confidence level $C_1$ ("conf1"), the confidence level of each predictor is evaluated to determine whether it satisfies (i.e., is greater than or equal to) the PTV. If the test is successful, the associated predictor is chosen and the predictor-specific prediction value ("pred#") is output as a system-level output to the host processor. Otherwise, the next lower predictor in priority is evaluated (pred#1) Ultimately, if no confidence level satisfies the PTV, then final predictor 206 ("predN") is selected by default.

In accordance with the foregoing discussion, confidence level Cn of last predictor 206 need not be measured since the prediction value Pn generated by this unit is utilized by default if no other predictor satisfies PTV. However, it may still be desirable to determine Cn for purposes other than selecting a predictor. For example, a supporting host computer may be configured to allow for the fetching of one or two instruction paths of a given conditional branch instruction. A confidence-level criteria may be used to trigger the fetching of the two paths, as described in Jacobsen.

As discussed above, system 200 provides for a hierarchical filtering operation where a given conditional branch instruction passes from one predictor to the next (moving downward in priority) until a predictor with a sufficiently high confidence level (Cx) is encountered or last predictor 206 is reached. Such filtering of branch instructions provides a mechanism for control over prediction operations. For example, a predictor type (e.g., last-direction, GSHARE, etc.) likely to have a sufficiently high confidence level to service a large volume of branch instructions or a particular type/class of instructions may be strategically placed upstream in system 200. Such positioning may help prevent the passing of certain branch instructions to predictors downstream where such instructions might disrupt or introduce algorithmically undesirable branches for a particular prediction scheme in the downstream stages.

Moreover, system 200 is highly modular and therefore easily expandable with additional stages. This modularity may be utilized to include, for example, additional predictors that service specific conditional branch instructions. Such specialty predictors may be assigned lower priority assuming the specific conditional branch instructions targeted by these predictors are unlikely to be serviced by predictors placed upstream.

Referring again to FIG. 1, after the actual outcome value 110 of a conditional branch instruction is determined, this information (and supporting state information 108) is returned to predictor 102 through feedback loop 105 for any necessary updating (in accordance with the prediction method employed by this predictor). This updating operation is also required by the predictors of system 200 of FIG. 2.

Referring to FIG. 2, if predictor 202 (i.e., the predictor having the highest priority) is selected to carry out a prediction operation, an actual outcome value and state information (provided by a host processor) is conceptually forwarded only to predictor 202 for updating purposes. However, if a predictor of lower priority (e.g., 204 or 206) is selected for prediction operations, then any predictor residing upstream (i.e., having higher priority) of this selected predictor as well as the selected predictor itself are conceptually provided with an actual outcome value and associated state information or updating (if necessary). Each predictor will receive the same actual outcome value (i.e., value 110 of FIG. 1). However, individualized state information associated with each predictor will be returned to the predictor from which it originated. As discussed below, this state information may include addresses for table locations disposed within each predictor that the actual outcome value is to be placed.

Update methodology applied to branch predictor system 200 of FIG. 2 is illustrated the pseudocode of Table 3.

TABLE 3

Update Methodology.

```
Update1 (actual, state1)
if not conf1 then
    Update2 (actual, state2)
    if not conf2 then
        Update3 (actual, state3)
```

TABLE 3-continued

Update Methodology.

```
        ...
        if not confN − 1 then
            UpdateN (actual, stateN)
        endif
        ...
    endif
endif
```

Referring to Table 3, update methodology begins with the update of predictor 202 (i.e., "Update1") via subroutine Update1. Actual outcome value ("actual") and state information associated with predictor 202 ("state1") are returned to predictor 202 for updating necessary. If confidence level $C_1$ ("conf1") did not satisfy the PTV for system 200, the next predictor 204 is also updated via subroutine Update2. This process continues until a predictor is reached whose confidence level satisfied the PTV or upon reaching final predictor 206. Significantly, as noted above, predictors assigned lower priority than the selected-predictor are not updated during this process.

A selected predictor (i.e., a predictor whose prediction is selected to carry out a branch prediction operation) and only those predictors residing upstream of the selected predictor (i.e., those predictors having a higher priority level) utilize update information in response to execution of a given conditional branch instruction. Accordingly, table space in predictors located downstream of a selected predictor is not wasted on actual outcome values generated by branch instructions serviced at higher priority predictors. Therefore, predictors of lower priority are disposed to be more application specific to the particular branch instructions they service since update information comes predominantly from these instructions. In other words, by reducing the number of branch instructions updating downstream predictors, there is less data in the tables of these predictors and therefore less likelihood of false sharing.

Figure 3A:
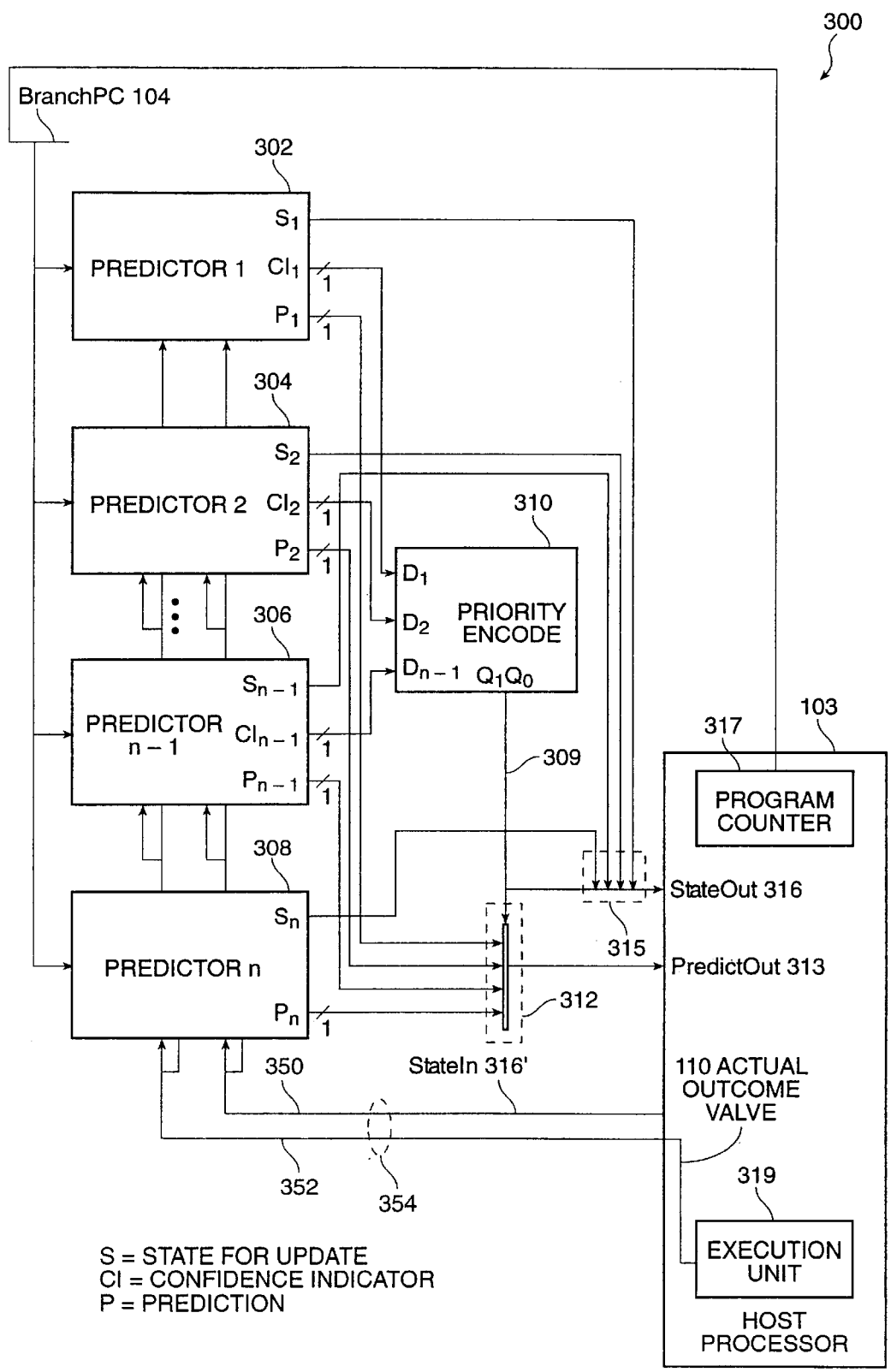
FIG. 3A is a block diagram of an embodiment of a branch predictor system using parallel-accessed predictors and filtering in accordance with the principles of the invention.
Figure 4:
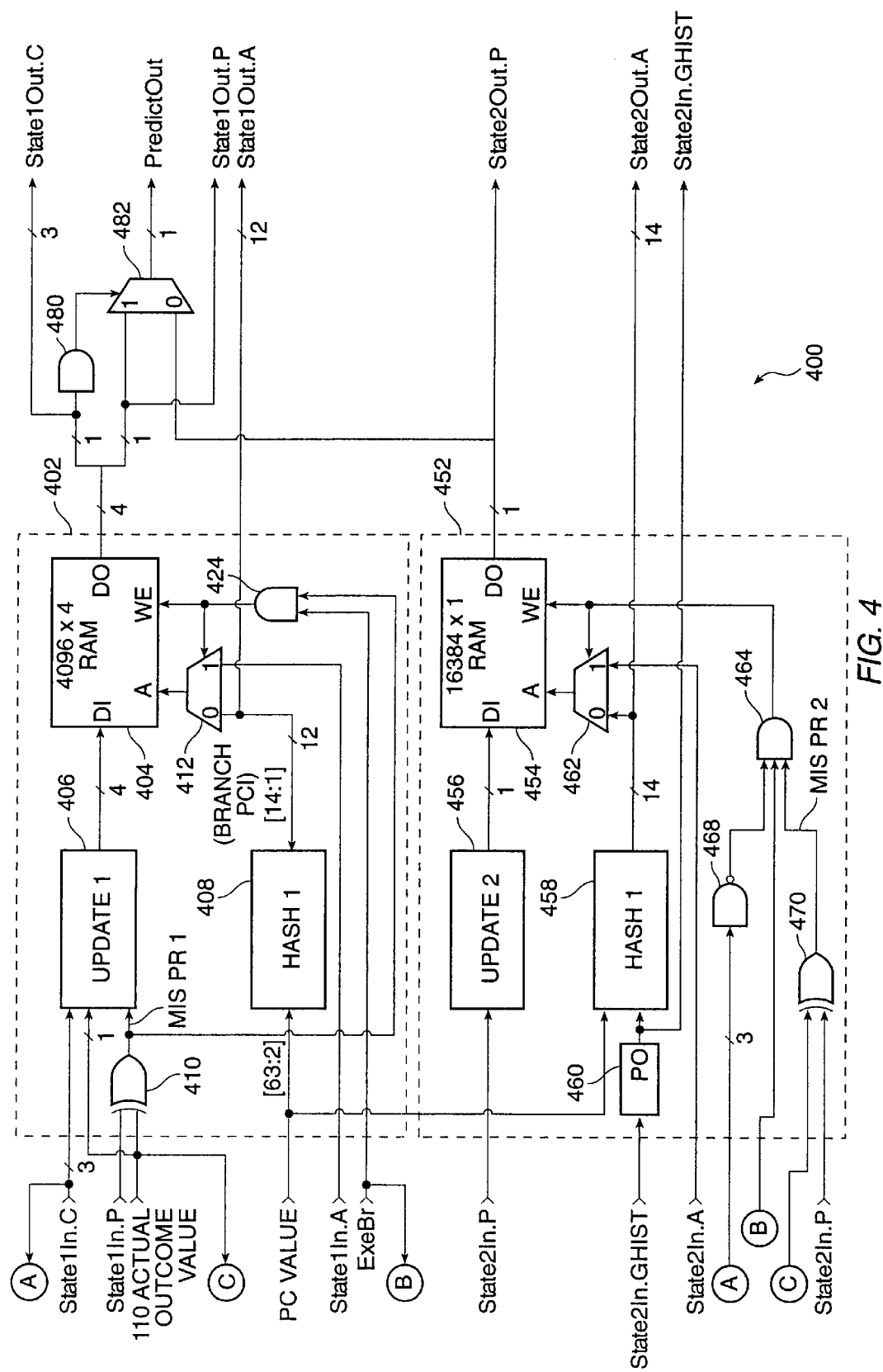
FIG. 4 is a block diagram or a preferred embodiment of a branch predictor system using filtering in accordance with the principles of the invention.

System 200 graphically illustrates branch prediction filtering through serial operation. Although this provides a convenient model to describe the conceptual flow and processing of conditional branch instructions, it is preferred that predictors be accessed in parallel. FIGS. 3A and 4 illustrate branch predictor systems having such parallel-accessed predictors.

B. System 300

FIG. 3A is a block diagram or an embodiment of a branch predictor system 300 using parallel-accessed predictors and filtering in accordance with the principles of the present invention. The data inputs from a conventional host processor 103 (i.e., BranchPC 104, StateIn 316' and actual outcome value 110) and outputs to host processor 103 (i.e., StateOut 316 and PredictOut 313) convey the same information as the individual constituent predictors would otherwise require and generate, respectively, when interfacing with a host processor. Standard control signals from processor 103, well known to those having ordinary skill in the art, are not shown. System 300 is preferably disposed within host processor 103, but for ease of discussion FIG. 3A shows system 300 coupled to processor 103.

Referring to FIG. 3A, a program counter 317 is coupled in parallel to several predictors 302–308. Similarly, input lines 350, 352 from processor 103 conveying StateIn 316' and actual outcome value 110, respectively, are coupled in parallel to predictors 302–308. Lines 350, 352 make up a feedback loop 354. Each predictor generates state information ("S") and a prediction ("P", also referred to as a "prediction value") from any well-known branch prediction method (e.g., last-direction, bimodal, PAG, GSHARE, etc.). Additionally, each predictor except for final predictor 308 generates a confidence level indicator ("CI") indicating whether the confidence level ("C") of that particular predictor satisfies the PTV for system 300 ("system 300 PTV") and therefore the associated prediction is acceptable to use. Computation of confidence level may be carried out, for example, in accordance with the pseudo-code described above in Table 1 or below in Table 5. Determination of whether a confidence level satisfies a PTV (i.e., generation of a CI within each predictor) may be carried out with discrete logic (e.g., like gate 480 of FIG. 4), a conventional comparator or any like device as would be apparent to one having ordinary skill in the art. (As noted above, although a prediction may be considered acceptable for use by its confidence level, its relative desirability—with respect to output from other predictors—is dependent upon the priority level of the associated predictor.)

If the confidence level C for a particular predictor is greater than or equal to system 300 PTV, then the associated CI is output as a logic high or one indicating acceptability of its associated prediction. Alternatively, if such confidence level C is less than system 300 PTV, the associated CI is output as a logic low or zero indicating unacceptability of its prediction. As an alternative embodiment, each predictor may be assigned an individual predetermined threshold value which must be satisfied to output a logic high CI. As an additional alternative, each processor may employ a different method of computing a confidence level. As a further alternative, criteria other than a confidence level may be used to indicate acceptability of a particular prediction.

Predictions $P_1$–$P_n$ from predictors 302–308, respectively, are forwarded to data inputs of multiplexer 312. Confidence level indicators $CI_1$–$CI_{n-1}$ from predictors 302–306, respectively, are forwarded to data inputs $D_1$–$D_{n-1}$ of priority encoder 310. The output of encoder 310 ($Q_1$,$Q_0$) is forwarded to the selection input of multiplexer 312. Through the processing of multiplexer 312 and encoder 310 (as described below) a collection of predictions (i.e., $P_1$–$P_n$) are reduced to a single value that is output to Processor 103. In brief, multiplexer 312 and encoder 310 select the most desirable prediction based on confidence-level and priority criteria.

Referring again to FIG. 3A, state information $S_1$–$S_n$ from predictors 302–308 is forwarded to state output device 315, which simply outputs $S_1$–$S_n$ in concatenated form to host microprocessor 103 as StateOut 316. Device 315 may be implemented with conventional logic, as would be apparent to one having ordinary skill in the art. This information is ultimately returned to system 300 as StateIn 316' for updating predictors 302–308, respectively.

More specifically, state information $S_1$–$S_n$, which is associated with a particular prediction and conditional branch instruction, is temporarily maintained in host processor 103 after the associated prediction is generated and ultimately returned to predictor system 300 at the time that an actual outcome value 110 is generated by the host processor or purposes of updating the predictor stages. State information may, for example, identify a location within a table of a predictor stage that is to receive actual outcome value 110 as an update. As shown in FIG. 1, the use of state information for performing updates to branch predictors is a conventional operation well known to those having ordinary skill in the art. System 300 of FIG. 3A simply concatenates this information to facilitate more than one predictor; i.e., forming a state information vector. Each predictor 302–308 extracts information with which it is associated when this vector is returned to system 300 as StateIn 316'.

Priority encoder 310 receives confidence level indicators $CI_1$–$CI_{n-1}$ from predictors 302–306 and processes the signals to effect a filtering result. Priority encoders are well-Knwon devices. Encoder 310 may be designed to function as any conventional encoder such as the MC10H165 available from Motorola, Inc. A truth table for the operation or encoder 310 is provided Table 4 below, where "L" is a logic low or zero (0), "H" is logic high so one (1) and "X" is a Don't Care. The "L" entries in Table 2 represent logic low CIs which signify confidence levels that do not satisfy (e.g., are less than) system 300 PTV. Conversely, the "H" entries in Table 4 represent logic high CIs which signify confidence levels that satisfy (e.g., are greater than or equal to) system 300 PTV.

TABLE 4

Truth Table for Encoder 310

| D1 | D2 | Dn - 1 | $Q_1$ | $Q_0$ | Stage Selected |
|---|---|---|---|---|---|
| L | L | L | 0 | 0 | n |
| H | X | X | 0 | 1 | 1 |
| L | H | X | 1 | 0 | 2 |
| L | L | H | 1 | 1 | n - 1 |

As Table 4 illustrates, if no predictor 302–306 has a confidence level C that satisfies system 300 PTV (i.e., $D_1=D_2=D_{n-1}=L$), then predictor 308 is desired as a prediction source. Accordingly, encoder 310 shall select prediction $P_n$ of predictor 308 by forwarding an address of 0 (i.e., $Q_1=0,Q_0=0$) to multiplexer 312 and thereby output $P_n$ as PredictOut 313. (PredictOut 313 is forwarded to a fetch unit (not shown) within host processor 103.) Alternatively, if any of predictors 302–306 has a confidence level that satisfies system 300 PTV, then one of those predictors shall be selected for providing PredictOut 313.

Referring to Table 4 and FIG. 3A, predictor 302 is assigned highest priority by encoder 310. If the confidence level of predictor 302 ($C_1$) satisfies system 300 PTV (i.e., $C_1$ is greater than or equal to system 300 PTV), then predictor 302 is desired as a prediction source regardless of the confidence levels or predictors 304 and 306. Accordingly, predictor 302 outputs a logic high $CI_1$ which is received at input $D_1$ of encoder 310. As a result encoder 310 shall select prediction $P_1$ of stage 302 by forwarding an address of decimal 1 (i.e., $Q_1=0,Q_0=1$) to multiplexer 312 and thereby output $P_1$ as PredictOut 313. Alternatively, if confidence level indicator $CI_1$ is a logic low (i.e., $C_1$ is less than system 300 PTV), and confidence level indicator $CI_2$ is a logic high (i.e., the confidence level of predictor 304, $C_2$, is greater than or equal to system 300 PTV), then predictor 304 is desired regardless of the value of confidence level indicator $CI_{n-1}$. Accordingly, encoder 310 shall select prediction $P_2$ by forwarding an address of decimal 2 (i.e., $Q_1 32\ 32\ 1,Q_0=0$) to multiplexer 312 and thereby output $P_2$ as PredictOut 313.

The foregoing description applies equally to selecting predictor 306. Confidence level indicators necessary to select the output of predictor 306 for a particular branch instruction is shown in row 4 of Table 4. Should system 300 include a greater number of non-final predictors (i.e., more than 302–306), then additional confidence level indicators "CI" would be provided to encoder 310. The values of these additional confidence level indicators follow the patterns set out in Table 4 to select predictors identified in this table; i.e., these additional values (between $CI_2$ and $CI_{n-1}$) would be L, X, X and L to select predictors 308, 302, 304 and 306, respectively.

As described above, selection of a branch prediction (i.e., $P_1$–$P_n$) within system 300 results in the output of that prediction (i.e., PredictOut 313) and associated state information (i.e., StateOut 316) to host processor 103. Upon execution of the associated conditional branch instruction by execution unit 319 in processor 103, the actual outcome value 110 (e.g., a single bit indicating whether the branch is taken or not-taken) resulting from such execution is returned to predictors 302–308 accompanied by the previously output state information (StateOut 316) referred to now as StateIn 316'. This state information is necessary to carry out update operations as described below.

Like system 200, update operations are performed only on the predictor selected to provide a prediction and any predictor of higher priority. Predictors of lower priority are not updated. Referring to FIG. 3A, actual outcome value 110 and associated state information for each predictor 302–308 are provided in parallel via feedback loop 354 to predictors 302–308. As described above in connection with system 200, eliminating the need to update predictors having lower priority reduces the load on these predictors (since less data is being retained) and, therefore, reduces the likelihood of false sharing.

Figure 3B:
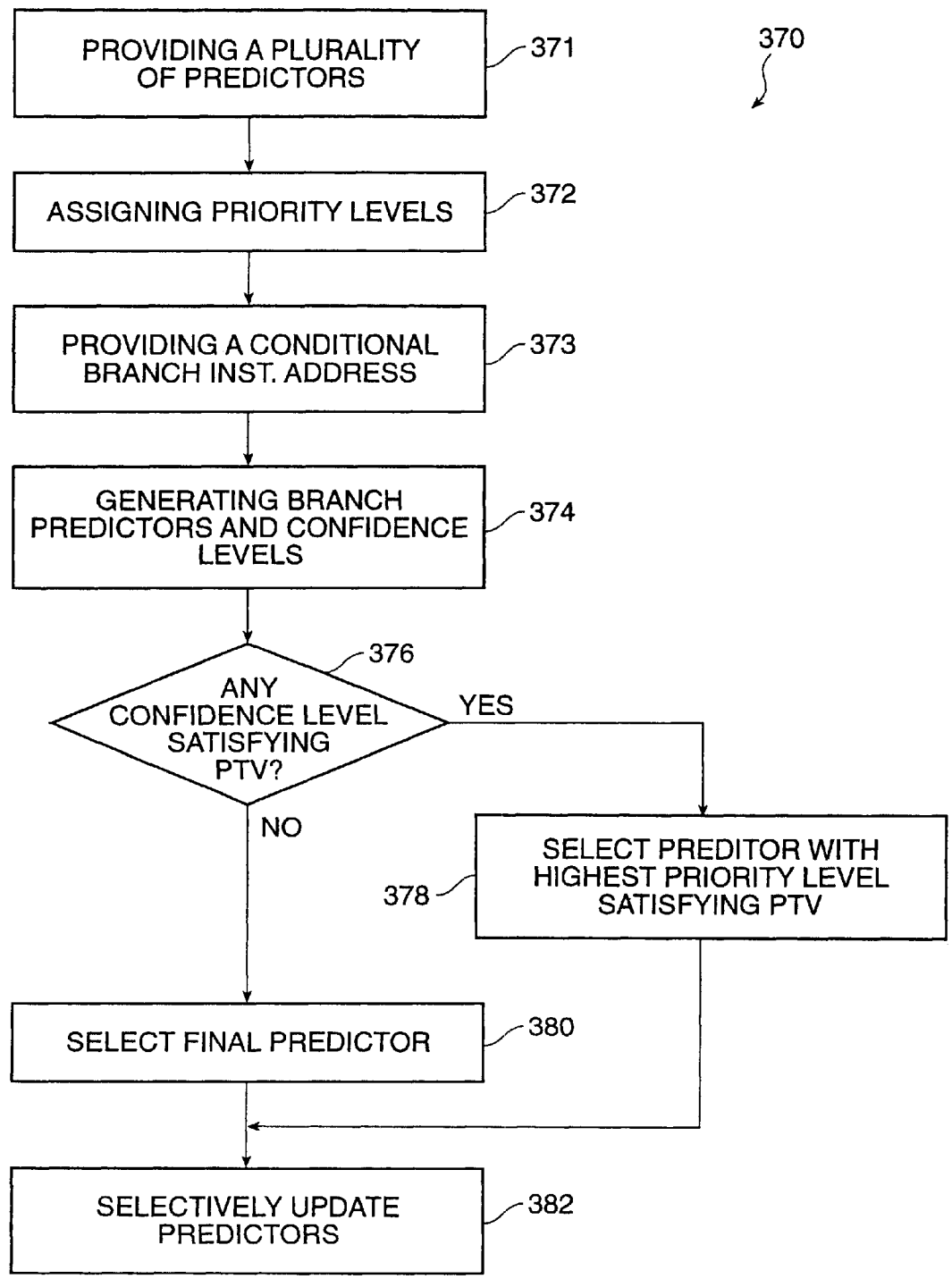
FIG. 3B is a flow chart of a method for generating a desired prediction for a given branch instruction in accordance with the principles of the invention.

Referring to FIG. 3B, flow chart 370 describes a method for generating a desired prediction for a given branch instruction according to the principles of the present invention. In block 371, a plurality of predictors are provided. These may be non-final predictors 302–306 and a final predictor 308, as shown in FIG. 3A. Next, these predictors are assigned priority levels in accordance with block 372. Priority assignment may be carried out through digital hardware, such as by coupling each predictor to a specific input of an encoder as shown in FIG. 3A. Any other method for assigning relational identifiers to components may also be used (e.g., software or firmware control).

Pursuant to block 21 373, an address (i.e., a PC value) for a given conditional branch instruction is provided to each predictor to initiate processing. In block 374, branch-prediction processing ensues; i.e., the generation of branch predictions and confidence levels at each predictor except, perhaps, the final predictor. As noted above, the generation of a confidence level at the final predictor is unnecessary to carry out the filtering operation of the present invention.

In decisional block 376, a determination is made as to whether any confidence level generated in block 374 satisfies the associated PTV and is therefore acceptable to use (subject to priority hierarchy). Satisfaction of a PTV is a design parameter unique to a particular system. A PTV may be satisfied, for example, if a confidence level is greater than or equal to the value of the PTV. Of course, any other comparative test may be applied. In an alterative embodiment, each predictor may have an individual PTV. If one or more predictors provide confidence levels that satisfy the associated PTV, the predictor with the highest priority level is selected as the desired predictor with the desired prediction pursuant to block 378.

Alternatively, if no predictor has a confidence level that satisfies the PTV, then the final predictor (e.g., predictor 308 of FIG. 3A) is selected by default as the desired predictor having the desired prediction, in accordance with block 380.

After execution of the predicted branch instruction, the predictors are selectively updated pursuant to block 382. Specifically, the desired predictor providing the desired prediction and every predictor having a higher priority than the desired predictor is subject to updating where necessary. Conversely, predictors with priorities lower than the desired predictor are rot updated with new prediction values.

C. System 400

Figure 12:
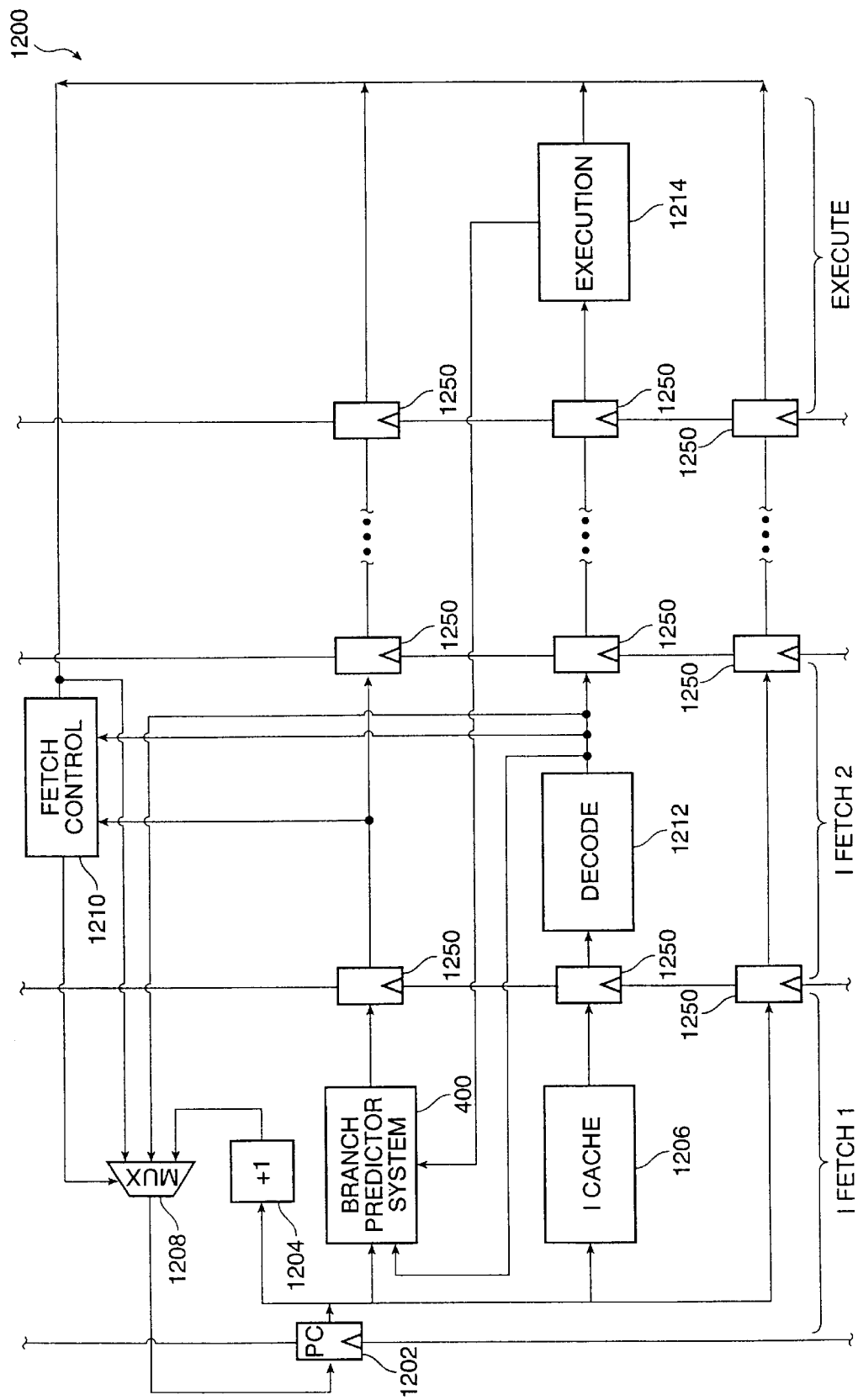
FIG. 12 is a simplified block diagram of a host processor that utilizes the predictor system of FIG. 4.

FIG. 4 illustrates a preferred embodiment of the present invention in the form of a branch predictor system 400. Like systems 200 and 300, predictor system 400 preferable resides within a conventional host processor which provides both data and control signals to the system. A simplified block diagram of a host processor 1200 supporting system 400 is shown in FIG. 12 and described below. As in the previous discussions, "high" and "low" signals in system 400 are logic ones and zeros, respectively.

Referring again to FIG. 4, system 400 includes a first constituent predictor 402 and final constituent predictor 452 employing last-direction prediction and GSHARE prediction, respectively. predictor 402 generates a confidence level "Stat1Out.C", a prediction (also referred to as a prediction value) "State1Out.P" and a lookup table address "State1Out.A" for the confidence level and prediction. Similarly, predictor 452 generates a prediction "State2Out.P" and a lookup table address "State2Out.A" for its prediction.

As shown in FIG. 4, system 400 includes AND gate 480 coupled to stage 402.(As an alternative embodiment, gate 480 may be disposed within predictor 402.) This gate receives confidence level "State1Out.C" and outputs a control signal to multiplexer 482. Gate 480 and multiplexer 482 collectively function as a selection circuit (e.g., like encoder 310 and multiplexer 312 of FIG. 3A). Additionally, gate 480 functions as a "PTV tester," generating a high signal when confidence level "State1Out.C" satisfies the PTV for system 400 (i.e., a decimal 7 in this embodiment) indicating acceptability of the associated prediction value, and a low signal otherwise. (As noted above, although a prediction may be considered acceptable for use, its relative desirability (with respect to output from other predictors) is dependent upon the priority level of the associated predictor.) The data inputs to multiplexer 482 are prediction "State1Out.P" 1 from predictor 402 and prediction "state2Out.P" from predictor 452. Based upon the control signal generated by gate 480, a prediction value from one of these two predictors is selected as the system-level prediction "PredictOut" for a given branch instruction.

1. Predictor Stare 402

Predictor 402 includes lookup table 404 (e.g., a 4096×4 RAM) whose data input is coupled to update circuit 406, address input ("A") is Coupled to multiplexer 412 and write enable input ("WE") is coupled to END gate 414. Circuit 406 and AND gate 414 are further coupled to the output of exclusive-OR gate 410. In addition, multiplexer 412 receives input from a hash unit 408 for prediction operation, as described below.

Inputs to predictor 402 include state inputs ("State1In.C" to update circuit 406, "State1In.P" to exclusive-OR gate 410 and "State1In.A" to multiplexer 412), actual outcome value 110 to gate 410 and circuit 406, program counter value ("PC value") to hash unit 408 and a branch execution signal "ExeBr" to AND gate 414. Input PC value is used to carry out a current branch prediction operation. The remaining inputs identified above are used for updating purposes.

During branch prediction operation of a given branch instruction, predictor 402 inputs a 62-bit PC value which is reduced to a 12-bit. tale address "BranchPC1" through hash unit 408. Unit 408 performs a simple masking function that allows bits [14:3] of PC value [63:2] to pass to address input A of table 404 through multiplexer 412. Table 404 functions as a last-direction predictor. Each entry of this table includes a 1-bit prediction and 3-bit confidence level which are associated with one or more branch instructions through "BranchcPC1". More specifically, each conditional branch instruction is associated with a unique PC value. Those branch instructions having the same subset of bits making up "BranchPC1" will access the same location in Table 404. During branch prediction, the entry in Table 404 accessed by "BranchPC1" is output from predictor 402 and processed as described below.

During update operations for a previously-predicted branch instruction, predictor 402 receives input from two primary sources the predictor itself and the host processor. Input signals from predictor 402 itself include a confidence level "State1In.C", stage-specific prediction "State1In.P", and a corresponding table address "State1In.A". (This state information was originally output by predictor 402 during the prediction operation for the previously-predicted branch instruction as "State1Out.C", "State1Out.P" and "State1Out.A", respectively.) These values have been maintained by the host processor while the previously-predicted branch instruction was processed and are returned to stage 402 several clock cycles later to coincide with the receipt of actual outcome value 110 generated by the host processor (upon execution of the previously-predicted branch instruction) for updating purposes.

In addition to value 110, host processor provides predictor 402 with signal "ExeBr" from an execution unit (not shown) indicating the successful execution of the previously-predicted branch instruction. In both stages 402 and 452, signal ExeBr functions as a "valid" signal for state information Referring to FIG. 4, prediction "State1In." and actual outcome value 110 are exclusively-ORed by gate 410 to produce a mispredict signal "MisPR1". When this signal is high, the inputs to gate 410 are different indicating the original prediction of predictor 402 for the previously-predicted branch instruction was incorrect. Signals "MisPr1" and "ExeBr" are forwarded to AND gate 414. If both signals are high, Table 404 is enabled via gate 414 to update an entry. Moreover, a high input from gate 414 is also used to allow address "State1In.A" to pass through multiplexer 412 (i.e., the corresponding table address of the previously-predicted branch instruction) to address input A of Table 404. The update to Table 404 for the previously-predicted branch instruction is provided by update circuit 405.

Figure 7:
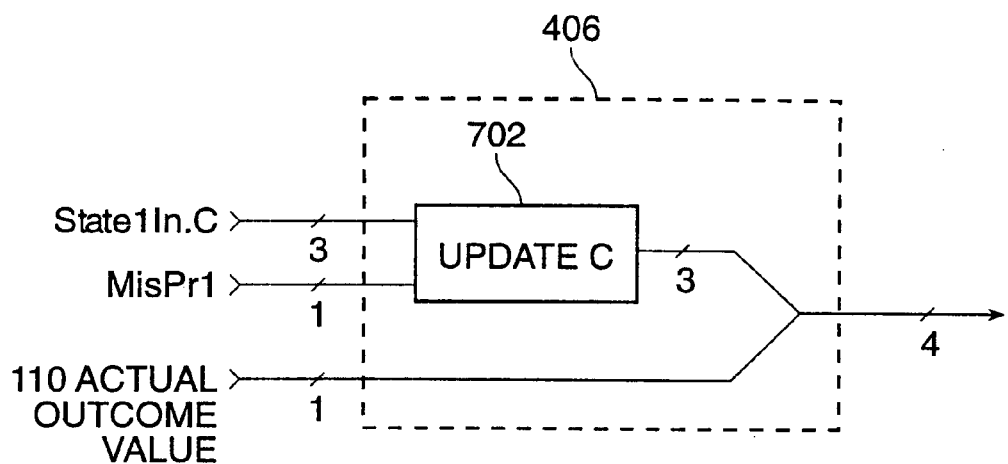
FIG. 7 is a block diagram of a first update circuit used in the predictor system of FIG. 4.

Referring to FIGS. 4 and 7, update circuit 406 inputs confidence level "State1In.C", "MisPr1" and actual outcome 110 and outputs a 4-bit signal that contains an updated 3-bit confidence level and a single bit representing actual outcome 110. As illustrated in FIG. 7, outcome value 110 simply passes through update circuit 406. However, the updated 3-bit confidence level is a product of update-C circuit 702. The functionality of circuit 702 is illustrated in the pseudocode of Table 5 and Truth Table of Table 6, which define the operation of an asymmetric saturating counter.

TABLE 5

Confidence:
    conf − count = countMax
Update:
    if actual = prediction then
        if count < countMax then
            count − count + 1
        endif TABLE 5-continued

```
else
    if count > countDecrement then
        count – count – countDecrement
    else
        count – 0
    endif
endif
```

Referring to the pseudocode in Table 5, a predetermined threshold value ("PTV") is defined as CountMax which, in this embodiment, is binary 111 (i.e., decimal 7). Further, the variable "countDecrement" in this embodiment is a decimal 4.

As the code in Table 5 illustrates, if actual outcome 110 ("actual") provided by the host processor matches prediction "State1In.P" ("prediction"; originally provided by Table 404 as "State1Out.P"), and if the current confidence level "State1In.C" ("count") is less than 7, then "State1In.C" is incremented by 1. Further, if there is a match but confidence level "State1In.C" equals 7, then "State1In.C" remains unchanged.

However, if there is no match between actual outcome 110 and prediction "State1In.P", and the confidence level "State1In.C" is greater than the variable countDecrement, then confidence level "State1In.C" is decremented by count-Decrement. Further, if there is no match and confidence level "State1In.C" is less than or equal to countDecrement, then the confidence level is returned to zero for that entry in Table 404. Implementation of this logic in the form of a Truth Table is provided in Table 6. Any conventional circuitry or device (such as a state machine) may be used to carry out the logic defined by Table 6.

TABLE 6

Truth Table for Update Circuit 406

| MisPr1 | State1In.C | Update C |
|---|---|---|
| 0 | 0 0 0 | 0 0 1 |
| 0 | 0 0 1 | 0 1 0 |
| 0 | 0 1 0 | 0 1 1 |
| 0 | 0 1 1 | 1 0 0 |
| 0 | 1 0 0 | 1 0 1 |
| 0 | 1 0 1 | 1 1 0 |
| 0 | 1 1 0 | 1 1 1 |
| 0 | 1 1 1 | 1 1 1 |
| 1 | 0 0 0 | 0 0 0 |
| 1 | 0 0 1 | 0 0 0 |
| 1 | 0 1 0 | 0 0 0 |
| 1 | 0 1 1 | 0 0 0 |
| 1 | 1 0 0 | 0 0 0 |
| 1 | 1 0 1 | 0 0 1 |
| 1 | 1 1 0 | 0 1 0 |
| 1 | 1 1 1 | 0 1 1 |

2. Predictor Stage 452

Referring again to FIG. 4 predictor 452 functions like a GSHARE predictor (as described in McFarling) with a one-bit saturating counter and fourteen-bit global-history register. Specifically, predictor 452 includes a lookup table 454 (e.g., a 16384×1 RAM) whose data input is coupled to update circuit 456, address input ("A") is coupled to multiplexer 462, and write enable input ("WE") is coupled to AND gate 464. Multiplexer 462receives input from a hash unit 458 which, in turn, receives input "State2Out.GHIST" from a global history register 460. In addition, AND gate 464 receives input from NAND gate 468 and exclusive-OR gate 470, as described below.

Figure 5:
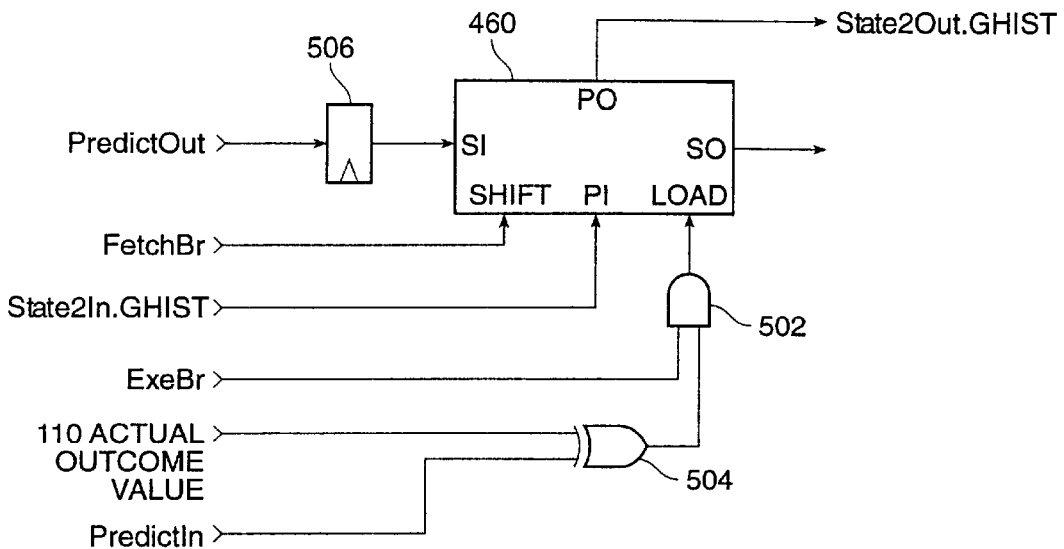
FIG. 5 is a block diagram of a global-history shift register used in the predictor system or FIG. 4.

Inputs to predictor 452 include state inputs ("State2In.P" to circuit 456, "State2In.A" so multiplexer 462, "State1In.C" to NAND gate 468, "State2In.P" to exclusive-OR gate 470, "State2In.GHIST" to register 460 and "PredictOut" to register 460 (via latch 506 as shown in FIG. 5)), actual outcome value 110 to gate 470, PC value to hash unit 458 and the branch execution signal "ExeBr" to AND gate 464. Inputs SC value and "PredictOut" are used to carry out a current branch prediction operation. The remaining inputs identified above are used for updating purposes.

Figure 6:
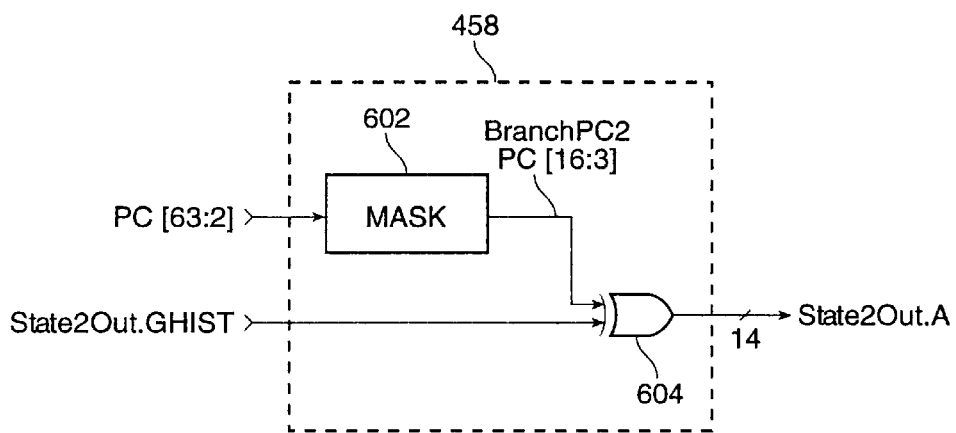
FIG. 6 is a block diagram of a hash unit used the predictor system of FIG. 4.

During branch prediction operation of a given branch instruction, predictor 452 inputs a 62-bit PC value which is reduced to a 14-bit table address by hash unit 458. Referring to FIG. 6, unit 458 performs a simple masking function in a mask circuit 602 that allows bits [16:3] of PC value [63:2] to pass to an exclusive-OR gate 604. The second input to gate 504 is global history word "State2Out.GHIST". This word is generated from the parallel output ("PO") of global history register 460, as shown in FIG. 5.

Returning to FIG. 4, predictor 452 operates in accordance with a GSHARE predictor having a one-bit saturation counter and fourteen-bit register. Upon fetching a branch instruction, hash unit 458 generates an address "State2Out.A" for lookup table 454 based upon the logical combination (i.e., exclusive-OR) of global history word "State2Out.GHIST" and bits [16:3] of PC value (i.e., "BranchPC2"). In response to this address, table 454 outputs a single-bit prediction "State2Out.P" which, as shown in FIG. 4, is forwarded to multiplexer 482. Signal "State2Out.P" represents a last-direction prediction. The prediction selected by multiplexer 482 ("PredictOut") is returned to shift register 460 via latch 506 (FIG. 5) and becomes part of global history word "State2Out.GHIST" through shirt-in input "SI" upon receipt of a "FetchBr" signal (indicating the subject branch instruction has been fetched and decoded) from the host processor.

During update operations for a previously-predicted branch instruction, predictor 452 receives input from our primary sources predictors 452, 402, the host processor and system 400. Input signals from predictor 452 include stage-specific prediction "State2In.P," a corresponding table address "State2In.A" and global history word "State2In.GHIST". Input signal from system 400 includes PredictIn. (This state information was originally output by predictor 452 and system 400 during the prediction operation for the previously-predicted branch instruction as "State2Out.P", "State2Out.A", "State2Out.GHIST" and "PredictOut", respectively.) Like predictor 402, these values have been maintained by the host processor while the previously-predicted branch instruction was processed and are returned to predictor 452 several clock cycles later to coincide with the receipt of actual outcome value 110 generated by the host processor (upon execution of the previously-predicted branch instruction) for up dating purposes.

In addition to value 110, host processor provides predictor 452 with signal "ExeBr" from an execution unit (not shown) indicating the successful execution of the previously-predicted branch instruction. Finally, predictor 452 receives confidence level "State1In.C" from predictor 402 to negate update operations for this predictor if a higher-priority predictor (i.e., predictor 402) was selected for prediction of the subject branch instruction.

In accordance with the logic shown in FIG. 4, should predictor 452 mispredict during a prediction operation in which the output of predictor 402 is used (i.e., "State1In.C"=7 which satisfies PTV in this embodiment), then the output of gate 468 is low forcing the output of gate 464 to be low. In which case, the write enable input of table 454 is not enabled and no update of predictor 452 will occur. However, should predictor 452 mispredict during a prediction operation in which the output of predictor 402 is not used (i.e., "State1In.C"≠7 which does not satisfy PTV in this embodiment), then the output of gate 468 is high allowing the output of gate 464 to go high. In which case, the write enable input of table 454 may be enabled (dependent upon the state of other signals as described below) and an update of predictor 452 may occur.

Referring again to the logic shown in FIG. 4, if prediction "State2In.P" does not equal actual outcome 110, the output of exclusive OR gate 470 will be high. After the subject branch instruction has been executed, host processor will output signal "ExeBr" high as well. Finally, since confidence level "State1In.C" of predictor 402 does not equal 7 (in this example), the output of gate 468 will also be high thereby forcing the output of gate 464 high and enabling the write operation of table 454. Table address "State2In.A" associated with the previously-predicted branch instruction undergoing update processing is applied to the address input of Table 454 through multiplexer 462. Finally, the original (and, in this example, incorrect) prediction "State2In.P" 10generated by predictor 452 is inverted by update circuit 456 (FIG. 8) and forwarded to data input DI of Table 454 to update the associated entry.

Figure 8:
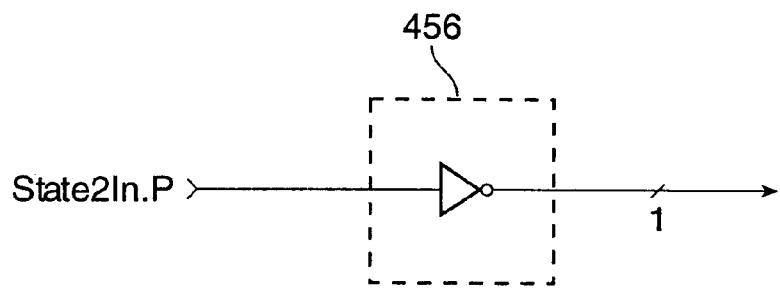
FIG. 8 is a block diagram or a second update circuit used in the predictor system of FIG. 4.

As shown in FIG. 8, circuit 456 consists of an inverter which serves to correct an erroneous prediction previously generated by predictor 452. This corrected value is input to table 454 during update operations provides predictor 402 was not originally selected for providing the prediction, as described above. As would be understood by one having ordinary skill in the art, the use of an inverter as circuit 456 is optional. Alternatively, circuit 456 may be eliminated in its entirety and input DI of table 454 may simply receive actual outcome value 110 generated by the host processor. This flexibility is possible since only a single bit is processed by circuit 456. More complex processing is required when multiple bits are updated, as required by predictor 402 (i.e., three-bit confidence level and one-bit prediction).

In the event of a misprediction, the global history word contained in register 460 (FIG. 5) will be inaccurate for that and any subsequent prediction. Accordingly, word "State2Out.GHIST" output to the host processor during prediction of the subject branch instruction is returned to register 460 or input via parallel input PI as "State2In.GHIST". Referring to FIG. 5,this updating operation is controlled by gates 502 and 504. As the circuit in FIG. 5 illustrates, should actual outcome 110 not equal the system-level prediction "PredictIn", exclusive OR gate 504 will output a logic high. Concurrently, host processor will output signal "ExeBr" to indicate th e subject branch instruction was executed. In accordance with the foregoing discussion, signal ExeBr functions as a "valid" signal for state in formation. Upon receipt of these signals, ate 502 will output a logic high enabling the loading operation of register 460.

3. System-Level Operation

Referring again to FIG. 4, a system-level description of operations will now be provided. During branch prediction operation one-bit predictions "State1Out.P" and "State2Out.P" from predictors 402 and 452, respectively a re provided to multiplexer 482 for a given conditional branch instruction. Concurrently, predictor 42 generates 3-bit confidence level "State1Out.C" which is forwarded to AND gate 480. The output of this gate is applied to the control input of multiplexer 482 and selects the prediction from either predictor 402 or 452. If all three bits of "State1Out.C" are high (representing a decimal 7), a logic high is applied to the selector input of multiplexer 482 thereby selecting "State1Out.P" as system-level prediction "PredictOut". Alternatively, if the output of AND gate 480 is a logic low, multiplexer 482 selects prediction "State2Out.P" and conveys this as system-level prediction "PredictOut". This prediction is forwarded to a fetching unit (not shown) of the host processor to control subsequent instruction streams.

The foregoing operational of gate 480 and multiplexer 482 is based upon a PTV for system 400 ("system 400 PTV") of decimal 7. Accordingly, when the prediction of predictor 402 for the given conditional branch instruction has a confidence level that satisfies system 400 PTV (i.e., a decimal value of 7), then the prediction "State1Out.P" from this predictor is used as the system-level prediction. However, when this prediction is not associated with a sufficiently high confidence level, the prediction from predictor 452, which in this embodiment is the final predictor, is utilized as the system-level prediction "PredictOut". Accordingly, gate 480 determines whether the confidence level generated in predictor 402 satisfies system 400 PTV and, if so, outputs a logic high to indicate acceptability.

Upon execution of the given conditional branch instruction by an execution unit in the host processor, actual output value 110 resulting from such execution (e.g., a single bit indicating whether the branch is taken or not-taken) is provided by the execution unit to the inputs of branch prediction system 400 through a feedback loop. If the confidence level "State1In.C" of stage 402 did not satisfy system 400 PTV (i.e., "State1Out.C" does not equal 7) when this prediction was made, lookup table 454 was selected or a prediction. If this prediction was correct, no change is made to Table 454. If, however, prediction bit "State2Out.P" from Table 454 is incorrect (i.e., this prediction does not equal actual outcome value 110 generated for the given branch instruction), then a complemented "State2Out.P" (equal to correct value 110 ) is written into lookup Table 454 to replace the previously stored prediction for this entry.

Further, when confidence level "State1In.C" does not satisfy system 400 PTV when a prediction is made, and if the associated actual outcome value 110 equals the associated prediction "State1Out.P" of Table 404, then confidence level "State1In.C" is incremented (but not beyond 7) in accordance with the pseudocode and truth table of Tables 5 and 6, respectively. The prediction associated with this confidence level remains unchanged. However, if actual outcome value 110 differs from prediction "State1Out.P" for the given branch instruction, then confidence level "State1In.C" is decremented by 4 (but not below 0) again in accordance with the pseudocode of Table 5. Additionally, the associated prediction "State1Out.P" is replaced with value 110 associated with the given branch instruction.

Finally, if the confidence level "State1In.C" for the given prediction operation does satisfy system 400 PTV (i.e., "State1Out.C" equals 7), then any update operation required applies exclusively to lookup Table 404. Significantly, no update is performed on Table 454 and, therefore, this table is saved from having space unnecessarily consumed by a branch instruction that relies on a different predictor stage for its prediction. (As described above, gate 468 of stage 452 prevents any update to Table 454 when confidence level "State1In.C" equals 7 and thereby satisfies system 400 PTV). However, global history register 460 will always be updated in accordance with the foregoing description in the event of a misprediction.

Figure 9:
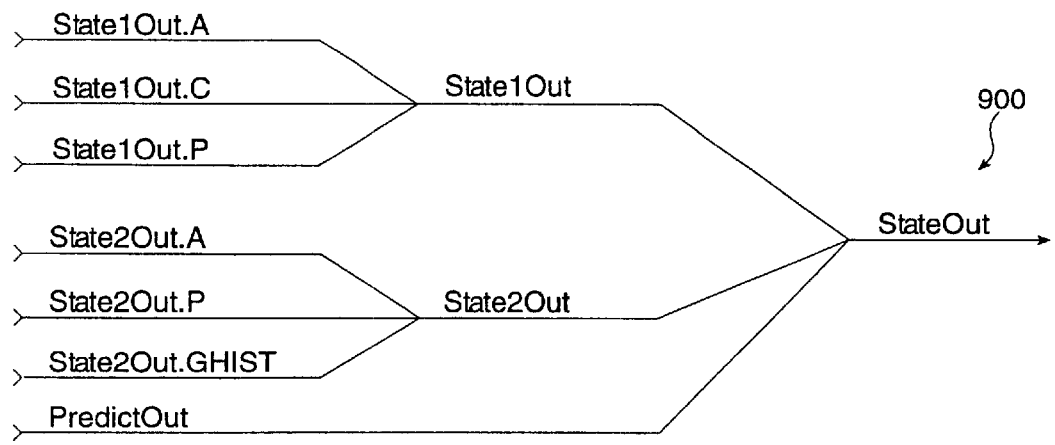
FIG. 9 illustrates state output signals generated by the predictor system or FIG. 4.
Figure 10:
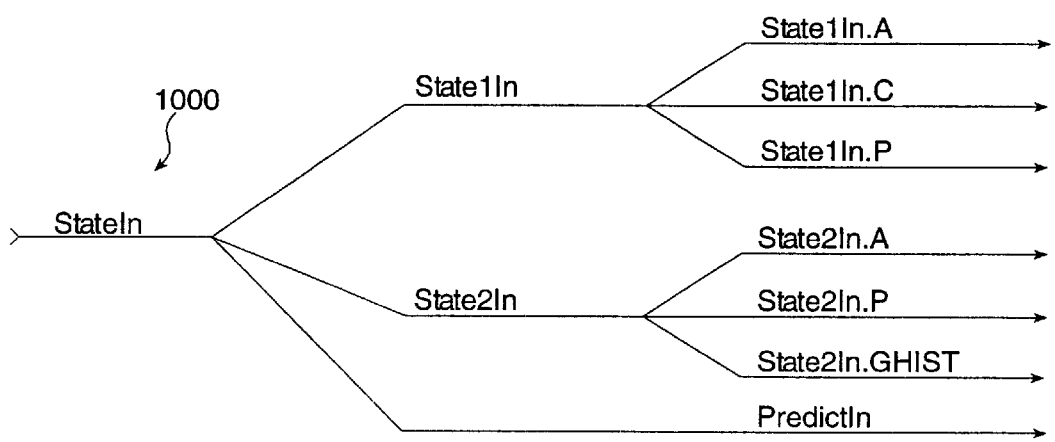
FIG. 10 illustrates state input signals received by the predictor system of FIG. 4.

FIG. 9 illustrates state output signals generated by branch predictor system 400. The seven state output signals that make up the composite StateOut 900 for System 400 are concatenated together and maintained by the host processor until needed for updating operations. In such case, StateOut 900 is returned to processor 400 as StateIn 1000 of FIG. 10. Referring to FIG. 10, StateIn 1000 contains the individual state signals required by various components of predictor system 400 to carry out updating operations. The output and input signals shown in FIGS. 9 and 10, respectively, bear a one-to-one correspondence. No change is made to their values. Rather, they are simply maintained by the host processor while a branch instruction is executed to provide the necessary information should. updating be required. These values may be maintained through a series of latches, cache memories or any other temporary storage.

In simulated operation, predictor 402 of branch predictor system 400 catches all conditional branches that nearly always go the same direction every time. The confidence level ("State1In.C") indicates that last-direction works well and no other prediction is required. On a sample benchmark (i.e., the 126.gcc program of SPECint95), 63% of branches were predicted by predictor 402 and only 37% passed on to final predictor 452. The mispredict rate on the branches predicted by first predictor 402 was only 2.1%. The 37% that passed on were of a more varied behavior and predictor 402 assigned low confidence levels to these branches. Such branches loaded onto predictor 452 which, as described above, incorporates global history in its prediction. Because the easily predicted branches of first predictor 402 did not consume table space in final predictor 452, this final predictor is more effective since there is less risk of false shares.

The miss rate on branch instructions serviced by final predictor 452 was 16.1% which resulted in a combined overall miss rate of 7.3%.

FIG. 11 illustrates trace-driven simulation results from 21 different predictors and predictor systems against the branch stream of the benchmark program SPECInt95 126.gcc on one of its many inputs (i.e., amptjp). Instruction and address traces were generated using conventional methods and fed into a branch prediction simulator program which decoded instructions, predicted branches and verified the predictions with the branch results to collect statistics for branch prediction accuracy. The program used for branch prediction simulation is attached as an appendix to this application. This program may be configured to model branch predictor system 400 of FIG. 4.

The exact command line that generated the trace that was simulated is:

./cc1-quiet-0-funroll-loops-fforce-mem-fcse-follow-jumps\-fcse-skip-blocks-fexpensive-optimizations\-fstrength-reduce-fpeephole-fschedule-insns\-finline-functions-fschedule-insns2\amptjp.i-o amptjp.s Referring again to FIG. 11, the types of predictors simulated are listed in the first column and include three bimodal predictors ("bimodal"), nine local history predictors ("local"), three GSHARE predictors ("gshare"), three combined predictors as defined in McFarling ("pair"), and three branch predictor systems utilizing filtering in accordance with the present invention ("filter"). Specific characteristics of each predictor and predictor system, as abbreviated in the first column, may be determined by reference to the appendix attached to this application. Columns 2 through 5 of FIG. 11 report table size in bytes ("MEM"), number of mispredicts experienced by the predictor or predictor system ("M"), number of branches serviced by each predictor or predictor system ("I"), and the ratio of mispredicts to branches ("M/B").

FIG. 12 illustrates the placement or branch predictor system 400 within a host processor 1200. This processor is pipelined with each stage being separated by latches 1250. As shown in FIG. 12, branch predictor system 400 receives program counter values (PC values) from program counter register 1202. System 400 processes every PC value received and generates a prediction value (i.e., PredictOut) whether or not such value is actually necessary. Control signals generated by host processor 1200, namely "FetchBr" and "ExeBr," determine the use of a particular PredictOut value.

Referring to FIG. 12, an instruction associated with a particular PC value will be retrieved, for example, from instruction cache 1206 and decoded by decoder 1212 concurrently with branch-prediction processing of system 400. The decoder will determine instruction type and feed this information back to system 400 as signal "FetchBr". This signal, as described above, controls the shift-in operation of global history register 460. Accordingly, a newly-computed PredictOut value is speculatively shifted into register 460 only if the corresponding instruction (via the PC value) is a conditional branch.

As shown in FIG. 12, both system 400 and decoder 1212 are coupled to a fetch control unit 1210. This unit receives a PredictOut value from system 400 and an instruction-type signal from decoder 1212 (i.e., a signal indicating, at least, whether the instruction associated with the latest PredictOut is a conditional branch). If the associated instruction is something other than a conditional branch, the PredictOut value can be safely ignored. However, if the associated instruction is a conditional branch, unit 1210 will utilize the corresponding PredictOut value generated by system 400 to fetch subsequent instructions in accordance with the prediction.

Referring again to FIG. 12, fetch control unit 1210 may select (via a multiplexer 1208) addresses provided by an execution unit 1214, decoder 1212 or an incrementor 1204. The address selected via multiplexer 1208 is forwarded to program counter register 1202 which, in turn, will forward the new address to system 400 and instruction cache 1206 to begin the process again.

Once the branch instruction is executed by execution unit 1214, actual outcome value, state information and a branch execution signal "ExeBr" are returned to system 400 to update predictors in accordance with the foregoing discussion of FIG. 4. More specifically, if the instruction associated with a particular PredictOut value is not a conditional branch instruction, then signal "ExeBr" (generated by execution unit 1214) will prohibit any updating of the predictors Of system 400, as described above. Alternatively, if such instruction is a conditional branch, then "ExeBr" shall be a logic high allowing selective updating as described above. Like the embodiment of FIG. 3A, actual outcome value 110 is also generated in execution unit 1214 and forwarded to system 400. Further, state information is temporarily held within host processor 1200 through any conventional means (i.e., latches, cache memory, etc.), until the actual outcome value is available. After which, this information is also forwarded to system 400 and updating may be performed.

While the foregoing is a complete description of the embodiments of the invention, various modifications, alternatives, and equivalents may be used. Accordingly, the above description should not be taken as limiting the scope of the invention which is defined by the appended claims.

What is claimed is:

1. A system that generates a prediction for a given situation comprising:

a plurality of dynamic predictors generating a plurality of prediction values for the given situation;

a multiplexer coupled to said plurality of dynamic predictors operable to select said prediction from said plurality of prediction values; and a feedback loop coupled to said plurality of dynamic predictors for updating only a portion of said dynamic predictors based upon an actual outcome of the given situation.

2. The system of claim 1 wherein said prediction indicates whether a conditional branch instruction is taken or not-taken.

3. The system of claim 1 wherein said plurality of dynamic predictors are each assigned a unique priority level and said prediction is generated from one of said plurality of dynamic predictors assigned a first priority level; and further wherein said portion of said dynamic predictors only includes predictors whose priority level meets or exceeds said first priority level.

4. system of claim 1 wherein said plurality of dynamic predictors are each assigned a unique priority level and at least one of said plurality of dynamic predictors is operable to indicate acceptability of its prediction value, and further wherein said prediction is generated by:

a first predictor of said plurality of dynamic predictors when said first predictor indicates acceptability of its prediction value and has a highest assigned priority level among any other predictor of said plurality of dynamic predictors that also indicates acceptability of its respective prediction value; and a second predictor of said plurality of dynamic predictors when none of said plurality of dynamic predictors indicates acceptability of its prediction value, said second predictor having a lowest assigned priority level.

5. The system of claim 4 wherein said prediction indicates whether a conditional branch instruction is taken or not-taken.

6. The system of claim 4 wherein said first predictor indicates acceptability of its prediction value when said first predictor generates a confidence level that satisfies a predetermined threshold value.

7. The system of claim 6 wherein said prediction indicates whether a conditional branch instruction is taken or not-taken.

8. The system of claim 6 wherein said confidence level is generated by an asymmetric saturating counter.

9. The system of claim 8 wherein said prediction indicates whether a conditional branch instruction is taken or not-taken and wherein said first predictor is a last-direction predictor.

10. The system of claim 9 wherein said second predictor is a GSHARE predictor.

11. A method for generating a prediction for a given instruction comprising:

providing a plurality of dynamic predictors for receiving address information of the instruction;

producing a prediction value by at least one predictor of said plurality of predictors;

processing said prediction value to generate said prediction; and updating only a portion of said dynamic predictors with actual outcome information provided from execution of said given instruction.

12. The method of claim 11 further comprising the step of assigning a priority level to each of said plurality of dynamic predictors wherein said at least one predictor has a first priority level and said portion of said dynamic predictors only includes predictors whose priority level meets or exceeds said first priority level.

13. The method of claim 11 further comprising the steps of:

assigning a priority level to each of said plurality of dynamic predictors; and indicating acceptability of said prediction value by said at least one predictor wherein said at least one predictor has a highest assigned priority level among any other predictor of said plurality of dynamic predictors that also indicates acceptability of its respective value.

14. The method of claim 13 wherein said step of indicating acceptability further comprises the steps of:

generating a confidence level by said at least one dynamic predictor; and determining whether said confidence level satisfies a predetermined threshold value.

15. A system that generates a prediction for a given situation comprising:

a plurality of predictors generating a plurality of prediction values for the given situation, wherein said plurality of predictors are each assigned a unique priority level and at least one of said plurality of predictors is operable to indicate acceptability of its prediction value, and further wherein said prediction is generated by:

a first predictor of said plurality of predictors when said first predictor indicates acceptability of its prediction value and has a highest assigned priority level among any other predictor of said plurality of predictors that also indicates acceptability of its respective prediction value; and a second predictor of said plurality of predictors when none of said plurality of predictors indicates acceptability of its prediction value; and a multiplexer coupled to said plurality of predictors operable to select said prediction from said plurality of prediction values.

16. The system of claim 15 wherein said prediction indicates whether a conditional branch instruction is taken or not-taken.

17. The system of claim 15 wherein said first predictor indicates acceptability of its prediction value when said first predictor generates a confidence level that satisfies a predetermined threshold value.

18. The system of claim 17 wherein said prediction indicates whether a conditional branch instruction is taken or not-taken.

19. The system of claim 17 wherein said confidence level is generated by an asymmetric saturating counter.

20. The system of claim 19 wherein said prediction indicates whether a conditional branch instruction is taken or not-taken and wherein said first predictor is a last-direction predictor.

21. The system of claim 20 wherein said second predictor is a GSHARE predictor.

22. A predictor system that generates a desired prediction for a given instruction comprising:

a plurality of predictors generating a plurality of predictions, each predictor being assigned a priority level and at least one predictor being operable to indicate acceptability of its prediction;

a selection circuit coupled to said plurality of predictors, said circuit selecting the desired prediction from a desired predictor, wherein said desired predictor is:

a first predictor of said plurality of predictors when said first predictor indicates acceptability of its prediction and has a highest assigned priority level among any other predictor of said plurality of predictors that also indicates acceptability of its respective prediction; and a second predictor of said plurality of predictors when none of said plurality of predictors indicates acceptability of its prediction.

23. The branch predictor system of claim 22 further comprising a feedback loop coupled to said plurality of predictors for updating only a portion of said plurality of predictors with actual outcome information provided from execution of said given instruction.

24. The branch predictor system of claim 22 wherein said selection circuit comprises:

a priority encoder coupled to said plurality of predictors; and a multiplexer coupled to said priority encoder and said plurality of predictors.

25. The branch predictor system of claim 24 wherein said desired prediction indicates whether a conditional branch instruction is taken or not taken.

26. The branch predictor system of claim 25 wherein said first predictor indicates acceptability of its prediction after said first predictor generates a confidence level that satisfies a predetermined threshold value.

27. The branch predictor system of claim 26 wherein said confidence level is generated by an asymmetric saturating counter.

* * * * *